United States Patent
Kim et al.

(10) Patent No.: US 11,739,199 B2
(45) Date of Patent: Aug. 29, 2023

(54) CARBOXYLIC ACID-MODIFIED NITRILE-BASED COPOLYMER LATEX COMPOSITION, PRODUCTION METHOD THEREFOR, LATEX COMPOSITION CONTAINING SAME FOR DIP MOLDING, AND MOLDED PRODUCT MOLDED THEREFROM

(71) Applicant: LG Chem, Ltd., Seoul (KR)

(72) Inventors: Jung Eun Kim, Daejeon (KR); Seung Uk Yeu, Daejeon (KR); Sang Jin Shin, Daejeon (KR); Won Sang Kwon, Daejeon (KR)

(73) Assignee: LG Chem, Ltd.

( * ) Notice: Subject to any disclaimer, the term of this patent is extended or adjusted under 35 U.S.C. 154(b) by 505 days.

(21) Appl. No.: 16/759,208

(22) PCT Filed: Feb. 11, 2019

(86) PCT No.: PCT/KR2019/001635
§ 371 (c)(1),
(2) Date: Apr. 24, 2020

(87) PCT Pub. No.: WO2019/172539
PCT Pub. Date: Sep. 12, 2019

(65) Prior Publication Data
US 2020/0317893 A1    Oct. 8, 2020

(30) Foreign Application Priority Data

Mar. 8, 2018 (KR) .................. 10-2018-0027279

(51) Int. Cl.
C08L 15/00    (2006.01)
C08J 5/02    (2006.01)
C08K 3/105    (2018.01)
C08K 3/011    (2018.01)
C08C 19/44    (2006.01)

(52) U.S. Cl.
CPC ............... *C08L 15/00* (2013.01); *C08J 5/02* (2013.01); *C08K 3/011* (2018.01); *C08K 3/105* (2018.01); *C08C 19/44* (2013.01); *C08J 2315/00* (2013.01); *C08L 2312/00* (2013.01)

(58) Field of Classification Search
CPC ....................................................... C08L 15/00
See application file for complete search history.

(56) References Cited

U.S. PATENT DOCUMENTS

| | | |
|---|---|---|
| 2004/0010067 A1 | 1/2004 | Ota et al. |
| 2005/0154122 A1 | 7/2005 | Ota et al. |
| 2008/0227913 A1 | 9/2008 | Koide |
| 2009/0292081 A1 | 11/2009 | Suddaby |
| 2012/0149859 A1 | 6/2012 | Yang et al. |
| 2014/0302265 A1 | 10/2014 | Yang et al. |
| 2017/0327669 A1 | 11/2017 | Ng et al. |
| 2018/0201767 A1 | 7/2018 | Kim et al. |

FOREIGN PATENT DOCUMENTS

| | | | |
|---|---|---|---|
| CN | 103930479 A | 7/2014 | |
| CN | 107636032 A | 1/2018 | |
| GB | 2455409 A * | 6/2009 | ............... C08J 3/24 |
| JP | 2003252667 A | 9/2003 | |
| JP | 2003342303 A | 12/2003 | |
| JP | 3900530 B2 | 4/2007 | |
| JP | 4196590 B2 | 12/2008 | |
| JP | 2009138194 A | 6/2009 | |
| JP | 2010059441 A | 3/2010 | |
| KR | 20100133638 A | 12/2010 | |
| KR | 20120069222 A | 6/2012 | |
| KR | 20130055334 A | 5/2013 | |
| KR | 101720840 B1 | 3/2017 | |
| KR | 20170060254 A | 6/2017 | |
| KR | 20170060793 A | 6/2017 | |
| KR | 20170094156 A | 8/2017 | |
| KR | 101920009 B1 | 11/2018 | |
| TW | 201529671 A | 8/2015 | |
| WO | WO-2016093689 A1 * | 6/2016 | ............. A41D 19/00 |
| WO | 2017126660 A1 | 7/2017 | |

OTHER PUBLICATIONS

Chinese Search Report for Application No. 201980005081.5 dated Jun. 23, 2021, 2 pages.
Search report from International Application No. PCT/KR2019/001635, dated May 27, 2019.

* cited by examiner

*Primary Examiner* — Vickey Nerangis
(74) *Attorney, Agent, or Firm* — Lerner David LLP

(57) ABSTRACT

Provided are a carboxylic acid-modified nitrile-based copolymer latex composition, a preparation method thereof, a latex composition for dip-molding including the same, and an article molded by the same, the carboxylic acid-modified nitrile-based copolymer latex composition including: a carboxylic acid-modified nitrile-based copolymer, wherein the carboxylic acid-modified nitrile-based copolymer includes a 2-hydroxyethyl methacrylate monomer-derived repeating unit in an amount of more than 0.1 wt % to less than 12 wt %, and a coagulum in the carboxylic acid-modified nitrile-based copolymer latex composition has an amount of less than 1 wt %.

9 Claims, No Drawings

CARBOXYLIC ACID-MODIFIED NITRILE-BASED COPOLYMER LATEX COMPOSITION, PRODUCTION METHOD THEREFOR, LATEX COMPOSITION CONTAINING SAME FOR DIP MOLDING, AND MOLDED PRODUCT MOLDED THEREFROM

CROSS-REFERENCE TO RELATED APPLICATION(S)

The present application is a National Phase Entry under 35 U.S.C. § 371 of International Application No. PCT/KR2019/001635 filed Feb. 11, 2019, which claims priority from Korean Patent Application No. 10-2018-0027279, filed Mar. 8, 2018, all of which are incorporated herein by reference.

TECHNICAL FIELD

The present invention relates to a carboxylic acid-modified nitrile-based copolymer latex composition, and more particularly, to a carboxylic acid-modified nitrile-based copolymer latex composition, a preparation method thereof, a latex composition for dip-molding including the same, and an article molded by the same.

BACKGROUND ART

Conventionally, natural rubber has been mainly used as raw material of industrial, medical and food gloves, and products requiring elasticity such as balloon, and condom, and the like. However, in recent years, natural rubber has been replaced with nitrile-based rubber since the natural rubber has side effects that cause serious allergic reactions to protein in some users. The nitrile-based rubber has high oil resistance, and thus the nitrile-based rubber is widely used particularly for work gloves that are used by users handling organic solvents, or for medical gloves and food gloves. In addition, a product manufactured from the nitrile-based rubber has characteristics that the product is not able to be easily pierced by an injection needle, or the like, as compared to a product manufactured from natural rubber, and thus there is an advantage that the product manufactured from the nitrile-based rubber is suitable for a person in the medical field handling sharp scalpels, injection needles, and the like.

In addition, recently, due to an unstable supply of natural rubber, a number of glove manufacturers have shifted a natural rubber glove production line to a nitrile-based rubber glove production line, and as the awareness of safety has increased, the use of disposable gloves manufactured from the nitrile-based rubber is steadily increasing.

According to this trend, the glove manufacturers are aiming to manufacture thin, good tear-proof gloves in order to increase productivity of gloves, and to this end, there is a demand for a latex for dip-molding capable of manufacturing gloves having a high tensile strength. One of the biggest factors affecting tensile strength in manufacture of gloves may include an ionic bond that is generated between methacrylic acid, which is one of monomers used in manufacturing a latex for dip-molding and zinc ions of zinc oxide that is added to a latex composition for dip-molding. The tensile strength of the gloves is determined according to how many ionic bonds are formed. However, in the case in which the latex for dip-molding is manufactured in order to increase the tensile strength of the gloves, there are problems in that when an amount of the methacrylic acid monomer increases, viscosity of the latex composition for dip-molding excessively increases, and when an amount of zinc oxide added increases, stability of the latex composition for dip-molding is lowered, thus causing defective gloves. Thus, it is difficult to increase the amount of the methacrylic acid monomer and the amount of zinc oxide added, and in particular, in the case in which food gloves are used, an amount of zinc oxide to be eluted is limited by regulations or the like, and thus the amount of zinc oxide added in the latex composition for dip-molding is also limited. Further, when a gel content increases or an amount of ionic bonds between methacrylic acid and zinc oxide increases at the time of manufacturing gloves in order to improve the tensile strength of the gloves, there are problems in that wearability of the gloves is lowered due to an increased value of a 300% modulus, which causes stiffness of the gloves when the gloves are worn.

In addition, when the gloves are worn, the gloves may tear during use due to sweat of the user, solutions to be handled, or the like. In order to prevent the tearing of the gloves, the gloves are required to have a predetermined level or more of durability. In particular, in the case of gloves used in industrial fields, the gloves are used in an environment exposed to acids, bases, organic solvents, or the like, and thus the gloves are required to have chemical resistance for protecting the user's body. However, as the glove becomes thinner, durability and chemical resistance of the glove are lowered. Thus, there is a continuous demand for a glove having a high tensile strength and a low 300% modulus while simultaneously having better durability and chemical resistance.

Meanwhile, in order to improve physical properties such as tensile strength, durability, chemical resistance, and the like, of the gloves, it is necessary to increase a speed of a film forming process at the time of manufacturing the gloves. When the speed of the film forming process increases, there is a problem that workability in manufacturing the glove is lowered. Particularly, syneresis, which is one of the physical properties expressed by workability, is a phenomenon in which water escapes from agglomeration of particles in the latex. When the speed of film forming increases at the time of manufacturing the gloves, a speed of this syneresis is also fast. If the speed of syneresis is excessively high, latex stability of the latex composition for dip-molding is lowered, resulting in formation of agglomerates, which may lead to defective gloves.

Further, in recent years, demands for environment, safety, and the like, have increased, and interest in residues in gloves has also increased. In connection to this, when amounts of residual monomers in the latex for manufacturing the gloves are high, the amounts of residual monomers in gloves increase, which causes an unpleasant smell when the gloves are used. In particular, when the monomer having a high boiling point remains, there is high possibility in which the monomer remains in the final product without being removed in a deodorization process of the latex and a glove manufacturing process. Therefore, in manufacturing the latex, in the case of the monomer having a high boiling point, a polymerization efficiency of the copolymer should be considered so that unreacted monomers do not remain.

DISCLOSURE

Technical Problem

An object of the present invention is to provide a dip-molded article manufactured by dip molding in which a tensile strength is improved, wearing feeling is improved by reducing a 300% modulus, and at the same time, durability, chemical resistance and workability of the dip-molded article are improved, and amounts of residual monomers are reduced.

In other words, the object of the present invention is to provide a carboxylic acid-modified nitrile-based copolymer latex composition for preparing a dip-molded article in which workability is improved at the time of manufacturing a dip-molded article such as gloves, or the like using the latex composition for dip-molding, the gloves have excellent wearability since 300% modulus is low, and even though the gloves are thin, the gloves do not tear easily due to high tensile strength, thus resulting in excellent durability, chemical resistance is excellent, and the amounts of the residual monomers are low, a preparation method thereof, a latex composition for dip-molding including the same, and a dip-molded article molded by the same.

Technical Solution

In one general aspect, a carboxylic acid-modified nitrile-based copolymer latex composition includes: a carboxylic acid-modified nitrile-based copolymer, wherein the carboxylic acid-modified nitrile-based copolymer includes a 2-hydroxyethyl methacrylate monomer-derived repeating unit in an amount of more than 0.1 wt % to less than 12 wt %, and a coagulum in the carboxylic acid-modified nitrile-based copolymer latex composition has an amount of less than 1 wt %.

In another general aspect, a preparation method of a carboxylic acid-modified nitrile-based copolymer latex composition includes: polymerizing a monomer mixture including more than 0.1 wt % to less than 12 wt % of 2-hydroxyethyl methacrylate monomer with respect to a total amount of the monomer mixture to prepare a carboxylic acid-modified nitrile-based copolymer latex composition including a carboxylic acid-modified nitrile-based copolymer (S10), wherein an entire amount of the 2-hydroxyethyl methacrylate monomer included in the monomer mixture is added before polymerization of step (S10) is initiated; a part thereof is added before the polymerization is initiated and the remaining amount thereof is added at a polymerization conversion rate of 20% to 60%; or the entire amount thereof is added at the polymerization conversion rate of 20% to 60%.

In still another general aspect, there is provided a latex composition for dip-molding including: the carboxylic acid-modified nitrile-based copolymer latex composition as described above; and a cross-linking agent composition.

In still another general aspect, there is provided an article including: a layer derived from the latex composition for dip-molding as described above.

Advantageous Effects

When a dip-molded article such as a glove or the like, is manufactured by using a latex composition for dip-molding including a carboxylic acid-modified nitrile-based copolymer latex composition according to the present invention, a tensile strength of the manufactured dip-molded article is improved, a wearing feeling is improved by reducing a 300% modulus, and at the same time, durability, chemical resistance and workability of the dip-molded article are improved, and amounts of residual monomers are reduced.

BEST MODE

Terms and words used in the present specification and claims are not to be construed as a general or dictionary meaning but are to be construed as meanings and concepts meeting the technical ideas of the present invention based on a principle that the inventors can appropriately define the concepts of terms in order to describe their own inventions in the best mode.

Hereinafter, the present invention will be described in more detail to assist in understanding the present invention.

The term "-derived repeating unit" used herein may refer to a component, structure, or a material itself resulting from any material, and as a specific example, the term "-derived repeating unit" may refer to a repeating unit formed in the polymer when monomers to be added participate in a polymerization reaction to form the polymer.

The term "latex" used herein may mean that a polymer or a copolymer polymerized by polymerization is present in a form dispersed in water. Specifically, the latex may mean that fine particles of a rubber-like polymer or fine particles of a rubber-like copolymer polymerized by emulsion polymerization are present in a colloidal state in which the fine particles are dispersed in water.

The term "coagulum" used herein may mean particles having an average particle diameter of 74 μm or more in which copolymers dispersed in the latex or the like are coagulated and/or agglomerated, and as a specific example, may refer to particles that have an average particle size of 74 μm or more and are sieved through a sieve having a 200 mesh size.

The term "layer derived" used herein may refer to a layer formed from a polymer or a copolymer. As a specific example, the layer derived may mean a layer formed from a polymer or a copolymer by attaching, fixing, and/or polymerizing the polymer or the copolymer on a dip-molding frame at the time of manufacturing a dip-molded article.

The term "cross-linking agent-derived cross-linking part" used herein may be a component, a structure or a material itself resulting from a compound, and may be a cross-linking part performing a cross-linking function in a polymer or between polymers formed by an action and a reaction of a cross-linking agent composition.

The carboxylic acid-modified nitrile-based copolymer latex composition according to the present invention is characterized in that in the latex composition including a carboxylic acid-modified nitrile-based copolymer, the carboxylic acid-modified nitrile-based copolymer may include a 2-hydroxyethyl methacrylate monomer-derived repeating unit in an amount of more than 0.1 wt % to less than 12 wt %, and a coagulum in the carboxylic acid-modified nitrile-based copolymer latex composition may have an amount of less than 1 wt %.

According to an embodiment of the present invention, the 2-hydroxyethyl methacrylate monomer-derived repeating unit may form a carboxylic acid-modified nitrile-based copolymer together with a monomer forming a carboxylic acid-modified nitrile-based copolymer or repeating units derived from the respective monomers. By including the 2-hydroxyethyl methacrylate monomer-derived repeating unit in the carboxylic acid-modified nitrile-based copolymer, a molded article manufactured from a latex composition for dip-molding including a carboxylic acid-modified nitrile-based copolymer latex composition including a carboxylic acid-modified nitrile-based copolymer has improved tensile properties such as tensile strength, and the like, an improved wearing feeling by lowering a 300% modulus, and excellent durability and chemical resistance.

As monomers similar to 2-hydroxyethyl methacrylate according to the present invention, hydroxyalkyl (meth)

acrylate monomers such as 2-hydroxypropyl methacrylate, 3-hydroxypropyl methacrylate, 2-hydroxybutyl methacrylate, 3-hydroxybutyl methacrylate, 4-hydroxybutyl methacrylate, 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, and the like, are used as the monomers in preparation of the carboxylic acid-modified nitrile-based copolymer latex composition. However, in the hydroxyalkyl methacrylate monomer such as hydroxybutyl methacrylate or the like, a chain of an alkyl group of a hydroxyalkyl group formed externally for each monomer-derived repeating unit, i.e., a side chain, is long, thus increasing a distance between main chains formed by respective monomer-derived repeating units, and thus a cross-linking ability of the cross-linking agent-derived cross-linking part formed by the cross-linking agent composition is deteriorated. In addition, in the hydroxyalkyl methacrylate monomer such as hydroxybutyl methacrylate or the like, an efficiency of forming a copolymer is lowered by 50% or more as compared with 2-hydroxyethyl methacrylate at the time of copolymerizing a conjugated diene-based monomer and an ethylenically unsaturated nitrile-based monomer in preparing the carboxylic acid-modified nitrile-based copolymer latex composition according to the present invention. Therefore, residual monomers that are not polymerized are present in the latex composition, and these residual monomers are not easily removed due to a high boiling point even after the deodorization process, which causes the amounts of the residual monomers of the molded article to increase.

Further, when the monomers such as hydroxypropyl acrylate and the like, including 2-hydroxyethyl acrylate, are used to prepare the carboxylic acid-modified nitrile-based copolymer latex composition according to the present invention, latex stability is lowered at the time of polymerization, and thus an amount of the coagulum in the molded article as well as the latex increases, and a function expected by the repeating units derived from monomers is not properly exhibited, whereby improvement of durability and chemical resistance, and syneresis is not sufficient.

Therefore, when a specific amount of the 2-hydroxyethyl methacrylate monomer-derived repeating unit is included in the carboxylic acid-modified nitrile-based copolymer according to the present invention, it is the most preferable since a molded article molded from the carboxylic acid-modified nitrile-based copolymer has improved tensile properties, an improved wearing feeling by reducing 300% modulus, improved durability and chemical resistance, reduced amounts of the residual monomers, and improved workability.

Further, according to an embodiment of the present invention, the carboxylic acid-modified nitrile-based copolymer may include the 2-hydroxyethyl methacrylate monomer-derived repeating unit in an amount of more than 0.1 wt % to less than 12 wt %, 0.5 wt % to 10 wt % %, 1 wt % to 8 wt %, or 1.5 wt % to 6 wt %. Within this range, the cross-linking ability of the cross-linking agent-derived cross-linking part formed by the cross-linking agent composition is improved, and thus the molded article manufactured from the latex composition for dip-molding including the carboxylic acid-modified nitrile-based copolymer latex composition including the carboxylic acid-modified nitrile-based copolymer has improved tensile properties such as tensile strength and the like, has a reduced 300% modulus to improve a wearing feeling, and has excellent durability and chemical resistance, excellent workability, and excellent long-term storage stability of the latex composition. The amount of the 2-hydroxyethyl methacrylate monomer-derived repeating unit described above by "wt %" may be an amount based on the total amount of the carboxylic acid-modified nitrile-based copolymer.

According to an embodiment of the present invention, the carboxylic acid-modified nitrile-based copolymer may include a conjugated diene-based monomer-derived repeating unit, an ethylenically unsaturated nitrile-based monomer-derived repeating unit, and an ethylenically unsaturated acid monomer-derived repeating unit, together with the 2-hydroxyethyl methacrylate monomer-derived repeating unit. That is, the carboxylic acid-modified nitrile-based copolymer according to an embodiment of the present invention may include the conjugated diene-based monomer-derived repeating unit, the ethylenically unsaturated nitrile-based monomer-derived repeating unit, the ethylenically unsaturated acid monomer-derived repeating unit, and the 2-hydroxyethyl methacrylate monomer-derived repeating unit. As a specific example, the carboxylic acid-modified nitrile-based copolymer may include the conjugated diene-based monomer-derived repeating unit in an amount of 40 wt % to 80 wt %, the ethylenically unsaturated nitrile-based monomer-derived repeating unit in an amount of 10 wt % to 50 wt %, the ethylenically unsaturated acid monomer-derived repeating unit in an amount of 0.1 wt % to 10 wt %, and the 2-hydroxyethyl methacrylate monomer-derived repeating unit in an amount of more than 0.1 wt % to less than 12 wt %.

According to an embodiment of the present invention, a conjugated diene-based monomer forming the conjugated diene-based monomer-derived repeating unit may be at least one selected from the group consisting of 1,3-butadiene, 2,3-dimethyl-1,3-butadiene, 2-ethyl-1,3-butadiene, 1,3-pentadiene, and isoprene. Specifically, the conjugated diene-based monomer may be 1,3-butadiene or isoprene, and more specifically, 1,3-butadiene. The carboxylic acid-modified nitrile-based copolymer may include the conjugated diene-based monomer-derived repeating unit in an amount of 40 wt % to 80 wt %, 45 wt % to 80 wt %, or 45 wt % to 70 wt %. Within this range, the dip-molded article molded from the latex composition for dip-molding including the carboxylic acid-modified nitrile-based copolymer latex composition including the carboxylic acid-modified nitrile-based copolymer is flexible and has excellent wearing feeling while simultaneously having excellent oil resistance and excellent tensile strength. The amount of the conjugated diene-based monomer-derived repeating unit described above by "wt %" may be an amount based on the total amount of the carboxylic acid-modified nitrile-based copolymer.

Further, according to an embodiment of the present invention, an ethylenically unsaturated nitrile-based monomer forming the ethylenically unsaturated nitrile-based monomer-derived repeating unit may be at least one selected from the group consisting of acrylonitrile, methacrylonitrile, fumaronitrile, α-chloronitrile and α-cyanoethyl acrylonitrile. Specifically, the ethylenically unsaturated nitrile-based monomer may be acrylonitrile and methacrylonitrile, and more specifically, may be acrylonitrile. Further, the carboxylic acid-modified nitrile-based copolymer may include the ethylenically unsaturated nitrile-based monomer-derived repeating unit in an amount of 10 wt % to 50 wt %, 15 wt % to 50 wt %, or 15 wt % to 45 wt %. Within this range, the dip-molded article molded from the latex composition for dip-molding including the carboxylic acid-modified nitrile-based copolymer latex composition including the carboxylic acid-modified nitrile-based copolymer is flexible and has an excellent wearing feeling while simultaneously having excellent oil resistance and excellent tensile strength. The amount of the ethylenically unsaturated nitrile-based monomer-derived repeating unit described above by "wt %" may be an amount based on the total amount of the carboxylic acid-modified nitrile-based copolymer.

Further, according to an embodiment of the present invention, an ethylenically unsaturated acid monomer forming the ethylenically unsaturated acid monomer-derived repeating unit may be an ethylenically unsaturated monomer containing an acid group such as a carboxyl group, a sulfonic acid group or an acid anhydride group. Specific examples of the ethylenically unsaturated acid monomer may include at least one selected from the group consisting of ethylenically unsaturated carboxylic acid monomers such as acrylic acid, methacrylic acid, itaconic acid, maleic acid, fumaric acid, and the like; polycarboxylic anhydrides such as maleic anhydride, citraconic anhydride, and the like; ethylenically unsaturated sulfonic acid monomers such as styrenesulfonic acid; and ethylenically unsaturated polycarboxylic acid partial ester monomers such as monobutyl fumarate, monobutyl maleate, mono-2-hydroxypropyl maleate, and the like. More specifically, the ethylenically unsaturated acid monomer may be at least one selected from the group consisting of acrylic acid, methacrylic acid, itaconic acid, maleic acid and fumaric acid, and more preferably methacrylic acid. The ethylenically unsaturated acid monomer may be used in the form of a salt such as an alkali metal salt, an ammonium salt, or the like, at the time of polymerization. Further, the carboxylic acid-modified nitrile-based copolymer may include the ethylenically unsaturated acid monomer-derived repeating unit in an amount of 0.1 wt % to 10 wt %, 0.5 wt % to 9 wt %, or 2 wt % to 8 wt %. Within this range, the dip-molded article molded from the latex composition for dip-molding including the carboxylic acid-modified nitrile-based copolymer latex composition including the carboxylic acid-modified nitrile-based copolymer is flexible and has an excellent wearing feeling while simultaneously having excellent tensile strength. The amount of the ethylenically unsaturated acid monomer-derived repeating unit described above by "wt %" may be an amount based on the total amount of the carboxylic acid-modified nitrile-based copolymer.

Further, according to an embodiment of the present invention, in the carboxylic acid-modified nitrile-based copolymer latex composition, the amount of the coagulum in the carboxylic acid-modified nitrile-based copolymer latex composition may be less than 1 wt %, less than 0.9 wt %, less than 0.1 wt %, or less than 0.01 wt %. Within this range, the carboxylic acid-modified nitrile-based copolymer latex composition has excellent polymerization stability and latex stability and prevents deterioration of physical properties caused by the coagulum in the article. The coagulum may be particles having an average particle size of 74 μm or more present in the carboxylic acid-modified nitrile-based copolymer latex composition. A generation amount may decrease or increase according to the kind of monomer and the addition timing. As a specific example, the coagulum may be particles having an average particle size of 74 μm or more, which are sieved through a sieve having a 200 mesh size. Further, the amount of the coagulum in the carboxylic acid-modified nitrile-based copolymer latex composition may be an amount based on the total amount of the carboxylic acid-modified nitrile-based copolymer latex composition.

Further, according to an embodiment of the present invention, the carboxylic acid-modified nitrile-based copolymer latex composition may have a solid content (concentration) of 10 wt % to 80 wt %, 30 wt % to 60 wt %, or 35 wt % 55 wt %, the pH of 7 to 12, 7 to 10, or 8 to 9.5. Within this range, latex stability and storage stability are excellent, and the latex composition for dip-molding is easily prepared.

Further, according to the present invention, there is provided a preparation method of a carboxylic acid-modified nitrile-based copolymer latex composition for preparing the carboxylic acid-modified nitrile-based copolymer latex composition. The preparation method of a carboxylic acid-modified nitrile-based copolymer latex composition may include: polymerizing a monomer mixture including more than 0.1 wt % to less than 12 wt % of 2-hydroxyethyl methacrylate monomer with respect to a total amount of the monomer mixture to prepare a carboxylic acid-modified nitrile-based copolymer latex composition including a carboxylic acid-modified nitrile-based copolymer (S10), wherein an entire amount of the 2-hydroxyethyl methacrylate monomer included in the monomer mixture is added before polymerization of step (S10) is initiated; a part thereof is added before the polymerization is initiated and the remaining amount thereof is added at a polymerization conversion rate of 20% to 60%; or the entire amount thereof is added at the polymerization conversion rate of 20% to 60%.

According to an embodiment of the present invention, the monomer mixture may include a conjugated diene-based monomer, an ethylenically unsaturated nitrile-based monomer, an ethylenically unsaturated acid monomer, and a 2-hydroxyethyl methacrylate monomer.

According to an embodiment of the present invention, the polymerization may be performed by emulsion polymerization. The polymerization may be performed by polymerization of the monomer mixture, and each monomer included in the monomer mixture may be added with reference to the kind and amount of the above-described monomers, and may be added batchwise or continuously.

Meanwhile, at the time of the polymerization, the 2-hydroxyethyl methacrylate monomer included in the monomer mixture may be made at any stage of the polymerization, and may be added by being divided two or more times in the polymerization step. As a specific example, the entire amount of the 2-hydroxyethyl methacrylate monomer may be added to a polymerization reactor while simultaneously adding each monomer before the polymerization is initiated prior to the polymerization, or a part of the 2-hydroxyethyl methacrylate monomer may be firstly added to the polymerization reactor before the polymerization is initiated and the remaining amount thereof may be added after the polymerization is initiated, or the entire amount of the 2-hydroxyethyl methacrylate monomer may be added after the polymerization is initiated without being added before the polymerization is initiated.

As a more specific example, the entire amount of the 2-hydroxyethyl methacrylate monomer included in the monomer mixture may be added before the polymerization of step (S10) is initiated, wherein there is an effect that polymerization stability is excellent; a part of the 2-hydroxyethyl methacrylate monomer may be added before the polymerization is initiated and the remaining amount thereof may be added at a polymerization conversion rate of 20% to 60%, 20% to 50%, or 20% to 40%, wherein there is an effect that the 2-hydroxyethyl methacrylate monomer-derived repeating unit is uniformly distributed in the carboxylic acid-modified nitrile-based copolymer to further improve tensile properties such as tensile strength, and the like; or the entire amount of the 2-hydroxyethyl methacrylate monomer may be added at the polymerization conversion rate of 20% to 60%, 20% to 50%, or 20% to 40%, wherein there is an effect that the amount of unreacted monomers is reduced. In particular, it is preferable to add the entire amount of the 2-hydroxyethyl methacrylate monomer at the polymerization conversion rate of below 60%, below 50% or below 40% in all cases such as batchwise addition, divisional addition, and the like. In this case, there is an effect of improving a copolymer formation efficiency of the 2-hydroxyethyl methacrylate monomer, thereby improving durability and chemical resistance of the article, and improving workability.

According to an embodiment of the present invention, the polymerization conversion rate may be calculated by the following Equation 1 below after collecting a predetermined amount of a sample from a composition under reaction at a predetermined time interval and measuring an amount of a solid content in the sample:

$$\text{Polymerization conversion rate (\%)} = (Ms - Mo)/(Mp - M'o) \quad [\text{Equation 1}]$$

in Equation 1 above, $Ms$ is a weight of a dried copolymer, $Mo$ is the sum of a weight of an emulsifier and a weight of a polymerization initiator, $Mp$ is a weight of the 100% polymerized copolymer, and $M'o$ is the sum of a weight of the emulsifier and a weight of the polymerization initiator.

Further, according to an embodiment of the present invention, the polymerization may be performed in the presence of an emulsifier, a polymerization initiator, a molecular weight modifier, and the like.

When the polymerization is performed by including the emulsifier, the emulsifier may be at least one selected from the group consisting of an anionic surfactant, a nonionic surfactant, a cationic surfactant and a positive surfactant. Specific examples of the emulsifier may include at least one anionic surfactant selected from the group consisting of alkylbenzenesulfonic acid salts, aliphatic sulfonic acid salts, higher alcohol sulfuric acid ester salts, α-olefin sulfonic acid salts, and alkyl ether sulfuric acid ester salts. Further, the emulsifier may be added in an amount of 0.3 to 10 parts by weight, 0.8 to 8 parts by weight, or 1.5 to 6 parts by weight based on 100 parts by weight of the total amount of the monomer mixture. Within this range, polymerization stability is excellent and a bubble generation amount is small, thus facilitating the manufacturing of the article.

Further, when the polymerization is performed by including the polymerization initiator, the polymerization initiator may be, for example, a radical initiator. As a specific example, the polymerization initiator may be at least one selected from the group consisting of inorganic peroxides such as sodium persulfate, potassium persulfate, ammonium persulfate, potassium perphosphate, hydrogen peroxide, and the like; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, t-butyl peroxyisobutyrate, and the like; and nitrogen compounds such as azobisisobutylonitrile, azobis-2,4-dimethylvaleronitrile, azobiscyclohexanecarbonitrile, azobis isobutyric acid (butyl acid) methyl, and the like. As a specific example, the polymerization initiator may be an inorganic peroxide, and more specifically, a persulfate. Further, the polymerization initiator may be added in an amount of 0.01 to 2 parts by weight, or 0.02 to 1.5 parts by weight based on 100 parts by weight of the total amount of the monomer mixture. Within this range, a polymerization rate may be maintained at an appropriate level.

Further, when the polymerization is performed by including a molecular weight modifier, the molecular weight modifier may be, for example, at least one selected from the group consisting of an α-methylstyrene dimer; mercaptans such as t-dodecylmercaptan, n-dodecylmercaptan, octylmercaptan, and the like; halogenated hydrocarbons such as carbon tetrachloride, methylene chloride, methylene bromide, and the like; and sulfur-containing compounds such as tetraethylthiuram disulfide, dipentamethylenethiuram disulfide, diisopropylxanthogen disulfide, and the like, and may be specifically, t-dodecylmercaptan. Further, the molecular weight modifier may be added in an amount of 0.1 to 2.0 parts by weight, 0.2 to 1.5 parts by weight, or 0.3 to 1.0 part by weight based on 100 parts by weight of the total amount of the monomer mixture. Within this range, the polymerization stability is excellent, and physical properties of the article are excellent when the article is manufactured after polymerization.

Further, according to an embodiment of the present invention, the polymerization may be performed by including an activator, and the activator may be, for example, at least one selected from the group consisting of sodium formaldehyde, sulfoxylate, sodium ethylenediamine tetraacetate, ferrous sulfate, dextrose, sodium pyrophosphate, and sodium sulfite. Further, the activator may be added in an amount of 0.001 to 5 parts by weight based on 100 parts by weight of the total amount of the monomer mixture.

Further, according to an embodiment of the present invention, the polymerization may be performed in water, specifically deionized water, as a medium. In order to ensure polymerization easiness, the polymerization may be performed by further including an additive such as a chelating agent, a dispersant, a pH adjuster, a deoxidizer, a particle size regulator, an antioxidant, an oxygen scavenger, or the like, if necessary. According to an embodiment of the present invention, the emulsifier, the polymerization initiator, the molecular weight modifier, the additive, and the like, may be added to a polymerization reactor at a time or divisionally, and may be continuously added at the time of each addition which is the same as the addition of the monomer mixture.

Further, according to an embodiment of the present invention, the polymerization may be performed at a polymerization temperature of 10° C. to 90° C., 20° C. to 80° C., or 25° C. to 75° C. Within this range, the latex stability is excellent.

Further, according to an embodiment of the present invention, a manufacturing method of a carboxylic acid-modified nitrile-based copolymer latex may include obtaining a carboxylic acid-modified nitrile-based copolymer latex composition by terminating the polymerization reaction. The polymerization reaction may be terminated at a polymerization conversion rate of 90% or more, or 95% or more. Further, the manufacturing method of the carboxylic acid-modified nitrile-based copolymer latex may further include removing unreacted monomers by a deodorization process after the reaction is terminated.

Further, according to the present invention, there is provided a latex composition for dip-molding including the carboxylic acid-modified nitrile-based copolymer latex. The latex composition for dip-molding may include the carboxylic acid-modified nitrile-based copolymer and a cross-linking agent composition. According to an embodiment of the present invention, the cross-linking agent composition may be provided for forming a cross-linking agent-derived cross-linking part through a cross-linking reaction with respect to the carboxylic acid-modified nitrile-based copolymer.

According to an embodiment of the present invention, the cross-linking agent composition may include a vulcanization agent and a vulcanization accelerator, and more specifically, may include a vulcanization agent, a vulcanization accelerator, and zinc oxide.

According to an embodiment of the present invention, the vulcanization agent is provided for vulcanizing the latex composition for dip-molding, and may be sulfur. Specific examples of the vulcanization agent may include sulfur such as powdered sulfur, precipitated sulfur, colloidal sulfur, surface treated sulfur, insoluble sulfur, and the like. The vulcanization agent may have an amount of 0.1 parts by weight to 10 parts by weight or 1 part by weight to 5 parts by weight based on 100 parts by weight (based on the solid content) of the total amount of the carboxylic acid-modified nitrile-based copolymer in the latex composition for dip-molding. Within this range, a cross-linking ability by sulfur is excellent.

In addition, according to an embodiment of the present invention, the vulcanization accelerator may be at least one selected from the group consisting of 2-mercaptobenzothiazole (MBT), 2,2-dithiobisbenzothiazole-2-sulfenamide (MBTS), N-cyclohexylbenzothiazole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. The vulcanization accelerator may have an amount of 0.1 parts by weight to 10 parts by weight or 0.5 parts by weight to 5 parts by weight based on 100 parts by weight (based on the solid content) of the total amount of the carboxylic acid-modified nitrile-based copolymer in the latex composition for dip-molding. Within this range, the cross-linking ability by vulcanization is excellent.

Further, according to an embodiment of the present invention, the zinc oxide may be a cross-linking agent for forming a cross-linking part through an ionic bond in the carboxylic acid-modified nitrile-based copolymer or between the carboxylic acid-modified nitrile-based copolymers by forming an ionic bond with a carboxyl group, or the like, of the carboxylic acid-modified nitrile-based copolymer in the latex composition for dip-molding. The zinc oxide may have an amount of 0.1 parts by weight to 5 parts by weight or 0.5 parts by weight to 4 parts by weight based on 100 parts by weight (based on the solid content) of the total amount of the carboxylic acid-modified nitrile-based copolymer in the latex composition for dip-molding. Within this range, the cross-linking ability is excellent, the latex stability is excellent, and tensile strength and flexibility of the manufactured dip-molded article are excellent.

Further, according to an embodiment of the present invention, the cross-linking agent composition may include a polyvalent metal cation compound. According to an embodiment of the present invention, the polyvalent metal cation compound may be a compound including aluminium ions and a ligand for allowing the aluminium ions to be slowly eluted. Specific examples of the polyvalent metal cation compound may include at least one selected from the group consisting of aluminium glycolate, aluminium acetylacetonate, aluminium lactate, and aluminium tartrate. Here, an amount of the ligand for allowing aluminium ions to be slowly eluted may be 1 to 3 equivalents of the amount of aluminium used. When the aluminium cation compound is used as a cross-linking agent for an ionic bond or a covalent bond as described above, it is possible to prevent weakening of the bond in an acidic solution, thereby preventing strength of the dip-molded article from being lowered. Further, in this case, it is possible to manufacture a dip-molded article without adding the vulcanization accelerator, and it is possible to prevent side effects of the user by the vulcanization accelerator.

In addition, according to an embodiment of the present invention, an amount of the polyvalent metal cation compound may be 0.1 to 5 parts by weight, 0.5 to 5 parts by weight, or 0.5 to 3 parts by weight based on 100 parts by weight (based on solid content) of the carboxylic acid-modified nitrile-based copolymer latex composition. Within this range, it is possible to prevent the weakening of the bond in an acidic solution, thereby preventing strength of the dip-molded article from being lowered.

In addition, according to an embodiment of the present invention, the latex composition for dip-molding may have a solid content (concentration) of 5 wt % to 40 wt %, 8 wt % to wt %, or 10 wt % to 30 wt %. Within this range, an efficiency of transporting latex is excellent, and storage stability is excellent by preventing an increase in latex viscosity.

As another example, the latex composition for dip-molding may have a pH of 9 to 12, 9 to 11.5, or 9.5 to 11. Within this range, the processability and productivity are excellent at the time of manufacturing a dip-molded article. The pH of the latex composition for dip-molding may be adjusted by addition of the pH adjuster described above. The pH adjuster may be, for example, an aqueous solution of potassium hydroxide having a concentration of 1 wt % to 5 wt %, or ammonia water having a concentration of 1 wt % to 5 wt %.

In addition, according to an embodiment of the present invention, the latex composition for dip-molding may further include an additive such as a pigment such as titanium dioxide, or the like, a filler such as silica, a thickener, a pH adjuster, or the like, as needed.

According to the present invention, there is provided an article including: a layer derived from the latex composition for dip-molding as described above. The article may be a dip-molded article manufactured by dip-molding the latex composition for dip-molding, and an article including: a layer derived from the latex composition for dip-molding formed from the latex composition for dip-molding by dip-molding. The manufacturing method of the dip-molded article for molding the article may include immersing the latex composition for dip-molding by a direct immersion method, an anode adhesion immersion method, a Teague adhesion immersion method, or the like. As a specific example, the manufacturing method of the dip-molded article may be performed by the anode adhesion immersion method, and in this case, there is an advantage of obtaining a dip-molded article having a uniform thickness.

As a specific example, the manufacturing method of the dip-molded article may include attaching a coagulant to a dip-molding frame (S100); immersing the dip-molding frame having the coagulant attached thereto in a latex composition for dip-molding to form a layer derived from a latex composition for dip-molding, i.e., a dip-molded layer (S200); and heating the dip-molded layer to crosslink the latex composition for dip-molding (S300).

According to an embodiment of the present invention, step (S100) is to attach the coagulant to a surface of the dip-molding frame by immersing the dip-molding frame in a coagulant solution so as to form the coagulant in the dip-molding frame, wherein the coagulant solution is a solution in which the coagulant is dissolved in water, an alcohol or a mixture thereof, and an amount of the coagulant in the coagulant solution may be 5 wt % to 75 wt %, or 10 wt % to 65 wt % or 15 wt % to 55 wt % based on the total amount of the coagulant solution. The coagulant may be, for example, at least one selected from the group consisting of metal halides such as barium chloride, calcium chloride, magnesium chloride, zinc chloride, aluminium chloride, and the like; nitrates such as barium nitrate, calcium nitrate, zinc nitrate, and the like; acetic acid salts such as barium acetate, calcium acetate, zinc acetate, and the like; and sulfates such as calcium sulfate, magnesium sulfate, aluminium sulfate, and the like. The coagulant may be specifically calcium chloride or calcium nitrate. Further, according to an embodiment of the present invention, step (S100) may further include immersing the dip-molding frame in the coagulant solution for 1 minute or more, taking out the dip-molding frame, and drying the dip-molding frame at 70° C. to 150° C. in order to attach the coagulant to the dip-molding frame.

According to an embodiment of the present invention, step (S200) may be performed, in order to form the dip-molded layer, by immersing the dip-molding frame having a coagulant attached thereto in the latex composition for dip-molding according to the present invention, taking out the dip-molding frame, and forming the dip-molded layer in the dip-molding frame. Further, according to an embodiment of the present invention, in step (S200), the immersing may be performed for 1 minute or more during the immersion in order to form the dip-molded layer in the dip-molding frame.

According to an embodiment of the present invention, step (S300) may be performed, in order to obtain the dip-molded article, by heating the dip-molded layer formed in the dip-molding frame to evaporate a liquid component, and cross-linking the latex composition for dip-molding to perform curing. Here, when the latex composition for dip-molding according to the present invention is used, cross-linking by vulcanization and/or ionic bond of the cross-linking agent composition included in the latex composition for dip-molding may be performed. Further, according to an embodiment of the present invention, the heating may be performed by a primary heating at 70° C. to 150° C. for 1 minute to 10 minutes, and by a secondary heating at 100° C. to 180° C. for 5 minutes to 30 minutes.

According to an embodiment of the present invention, the article may be a glove such as a surgical glove, an inspection glove, an industrial glove, a household glove, or the like, a condom, a catheter, or a health care product.

Hereinafter, the following Examples of the present invention are provided to explain the present invention in more detail. It is obvious to those skilled in the art, however, that the following Examples are illustrative of the present invention and that various changes and modifications can be made within the scope and spirit of the invention, and thus the scope of the present invention is not limited thereto.

EXAMPLE

Example 1

<Preparation of Carboxylic Acid-Modified Nitrile-Based Copolymer Latex Composition>

A 10 L high-pressure reactor was filled with nitrogen, the reactor being equipped with an agitator, a thermometer, a cooler, a nitrogen gas inlet, and an inlet so that a monomer, an emulsifier, and a polymerization initiator were capable of being continuously added, then 100 parts by weight of a monomer mixture including 32 wt % of acrylonitrile, 59 wt % of 1,3-butadiene, 6 wt % of methacrylic acid, and 3 wt % of 2-hydroxyethyl methacrylate, 3 parts by weight of sodium alkylbenzenesulfonate, 0.6 parts by weight of t-dodecyl mercaptan, and 140 parts by weight of ion-exchanged water were added, and the mixture was heated to 38° C. After the heating was completed, 0.3 parts by weight of potassium persulfate as a polymerization initiator was added to perform polymerization. When a polymerization conversion rate reached 95%, 0.1 parts by weight of sodium dimethyldithiocarbamate was added to terminate the polymerization. Subsequently, unreacted monomers were removed through a deodorization process, and ammonia water, an antioxidant, and a defoaming agent were added to obtain a carboxylic acid-modified nitrile-based copolymer latex composition having a solid content concentration of 45 wt % and a pH of 8.5.

<Preparation of Latex Composition for Dip-Molding>

To 100 parts by weight (based on the solid content) of the carboxylic acid-modified nitrile-based copolymer latex composition obtained above, 1 part by weight of sulfur, 0.7 parts by weight of zinc di-n-butyldithiocarbamate (ZDBC), 1.5 parts by weight of zinc oxide, 1 part by weight of titanium oxide, a potassium hydroxide solution, and secondary distilled water were added to obtain a latex composition for dip-molding having a solid concentration of 16 wt % and a pH of 10.

<Manufacture of Dip-Molded Article>

13 wt % of calcium nitrate, 86.5 wt % of water, and 0.5 wt % of a wetting agent (Teric 320, Huntsman Corporation, Australia) were mixed to prepare a coagulant solution. A hand-shaped ceramic mold was immersed in the prepared coagulant solution for 1 minute, then taken out, and dried at 80° C. for 3 minutes to coat the coagulant onto the hand-shaped mold.

Thereafter, the hand-shaped mold coated with the coagulant was immersed in the obtained latex composition for dip-molding for 1 minute, taken out, dried at 80° C. for 1 minute, and immersed in water for 3 minutes. Again, the mold was dried at 80° C. for 3 minutes and then cross-linked at 125° C. for 20 minutes. Thereafter, the cross-linked dip-molded layer was peeled off from the hand-shaped mold to obtain a glove-shaped dip-molded article.

Example 2

Example 2 was performed in the same manner as in Example 1 except that 100 parts by weight of a monomer mixture including 30 wt % of acrylonitrile, 58 wt % of 1,3-butadiene, 6 wt % of methacrylic acid, and 6 wt % of 2-hydroxyethyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Example 3

Example 3 was performed in the same manner as in Example 1 except that 100 parts by weight of a monomer mixture including 32 wt % of acrylonitrile, 60.5 wt % of 1,3-butadiene, 6 wt % of methacrylic acid, and 1.5 wt % of 2-hydroxyethyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Example 4

Example 4 was performed in the same manner as in Example 1 except that 100 parts by weight of a monomer mixture including 30 wt % of acrylonitrile, 58 wt % of 1,3-butadiene, 6 wt % of methacrylic acid, and 6 wt % of 2-hydroxyethyl methacrylate as the monomer mixture was added to the same reactor at the time of preparing the carboxylic acid-modified nitrile-based copolymer latex composition, provided that 3 wt % of 2-hydroxyethyl methacrylate was added before the polymerization was initiated and 3 wt % of 2-hydroxyethyl methacrylate was added at a polymerization conversion rate of 30% in the manner of divisional addition. Here, the obtained carboxylic acid-modified nitrile-based copolymer latex composition had a solid content concentration of 45 wt % and pH of 8.5.

Example 5

<Preparation of Carboxylic Acid-Modified Nitrile-Based Copolymer Latex Composition>

A 10 L high-pressure reactor was filled with nitrogen, the reactor being equipped with an agitator, a thermometer, a cooler, a nitrogen gas inlet, and an inlet so that a monomer, an emulsifier, and a polymerization initiator were capable of being continuously added, then 100 parts by weight of a monomer mixture including 32 wt % of acrylonitrile, 59 wt % of 1,3-butadiene, 6 wt % of methacrylic acid, and 3 wt % of 2-hydroxyethyl methacrylate, parts by weight of sodium alkylbenzenesulfonate, 0.6 parts by weight of t-dodecyl mercaptan, and 140 parts by weight of ion-exchanged water were added, and the mixture was heated to 38° C. After the heating was completed, 0.3 parts by weight of potassium persulfate as a polymerization initiator was added to perform polymerization. When a polymerization conversion rate reached 95%, 0.1 parts by weight of sodium dimethyldithiocarbamate was added to terminate the polymerization. Subsequently, unreacted monomers were removed through a deodorization process, and ammonia water, an antioxidant, and a defoaming agent were added to obtain a carboxylic acid-modified nitrile-based copolymer latex composition having a solid content concentration of 45 wt % and a pH of 8.5.

<Preparation of Latex Composition for Dip-Molding>

To 100 parts by weight (based on a solid content) of the carboxylic acid-modified nitrile-based copolymer latex composition obtained above, 2 parts by weight of aluminium acetylacetonate, 1 part by weight of titanium oxide, a potassium hydroxide solution, and secondary distilled water were added to obtain a latex composition for dip-molding having a solid concentration of 16 wt % and a pH of 10.

<Manufacture of Dip-Molded Article>

13 wt % of calcium nitrate, 86.5 wt % of water, and 0.5 wt % of a wetting agent (Teric 320, Huntsman Corporation, Australia) were mixed to prepare a coagulant solution. A hand-shaped ceramic mold was immersed in the prepared coagulant solution for 1 minute, then taken out, and dried at 80° C. for 3 minutes to coat the coagulant onto the hand-shaped mold.

Thereafter, the hand-shaped mold coated with the coagulant was immersed in the obtained latex composition for dip-molding for 1 minute, taken out, dried at 80° C. for 1 minute, and immersed in water for 3 minutes. Again, the mold was dried at 80° C. for 3 minutes and then cross-linked at 125° C. for 20 minutes. Thereafter, the cross-linked dip-molded layer was peeled off from the hand-shaped mold to obtain a glove-shaped dip-molded article.

Example 6

<Preparation of Carboxylic Acid-Modified Nitrile-Based Copolymer Latex Composition>

A 10 L high-pressure reactor was filled with nitrogen, the reactor being equipped with an agitator, a thermometer, a cooler, a nitrogen gas inlet, and an inlet so that a monomer, an emulsifier, and a polymerization initiator were capable of being continuously added, then 100 parts by weight of a monomer mixture including 30 wt % of acrylonitrile, 58 wt % of 1,3-butadiene, 6 wt % of methacrylic acid, and 6 wt % of 2-hydroxyethyl methacrylate, parts by weight of sodium alkylbenzenesulfonate, 0.6 parts by weight of t-dodecyl mercaptan, and 140 parts by weight of ion-exchanged water were added, and the mixture was heated to 38° C. After the heating was completed, 0.3 parts by weight of potassium persulfate as a polymerization initiator was added to perform polymerization. When a polymerization conversion rate reached 95%, 0.1 parts by weight of sodium dimethyldithiocarbamate was added to terminate the polymerization. Subsequently, unreacted monomers were removed through a deodorization process, and ammonia water, an antioxidant, and a defoaming agent were added to obtain a carboxylic acid-modified nitrile-based copolymer latex composition having a solid content concentration of 45 wt % and a pH of 8.5.

<Preparation of Latex Composition for Dip-Molding>

To 100 parts by weight (based on a solid content) of the carboxylic acid-modified nitrile-based copolymer latex composition obtained above, 2 parts by weight of aluminium glycolate, 1 part by weight of titanium oxide, a potassium hydroxide solution, and secondary distilled water were added to obtain a latex composition for dip-molding having a solid concentration of 16 wt % and a pH of 10.

<Manufacture of Dip-Molded Article>

13 wt % of calcium nitrate, 86.5 wt % of water, and 0.5 wt % of a wetting agent (Teric 320, Huntsman Corporation, Australia) were mixed to prepare a coagulant solution. A hand-shaped ceramic mold was immersed in the prepared coagulant solution for 1 minute, then taken out, and dried at 80° C. for 3 minutes to coat the coagulant onto the hand-shaped mold.

Thereafter, the hand-shaped mold coated with the coagulant was immersed in the obtained latex composition for dip-molding for 1 minute, taken out, dried at 80° C. for 1 minute, and immersed in water for 3 minutes. Again, the mold was dried at 80° C. for 3 minutes and then cross-linked at 125° C. for 20 minutes. Thereafter, the cross-linked dip-molded layer was peeled off from the hand-shaped mold to obtain a glove-shaped dip-molded article.

Comparative Example 1

Comparative Example 1 was performed in the same manner as in Example 1 except that 100 parts by weight of a monomer mixture including 32 wt % of acrylonitrile, 62 wt % of 1,3-butadiene, and 6 wt % of methacrylic acid as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 2

Comparative Example 2 was performed in the same manner as in Example 1 except that 100 parts by weight of a monomer mixture including 27 wt % of acrylonitrile, 56.5 wt % of 1,3-butadiene, 4.5 wt % of methacrylic acid, and 12 wt % of 2-hydroxyethyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 3

Comparative Example 3 was performed in the same manner as in Example 1 except that 100 parts by weight of a monomer mixture including 32 wt % of acrylonitrile, 61.9 wt % of 1,3-butadiene, 6 wt % of methacrylic acid, and 0.1 wt % of 2-hydroxyethyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 4

Comparative Example 4 was performed in the same manner as in Example 1 except that 100 parts by weight of a monomer mixture including 30 wt % of acrylonitrile, 58 wt % of 1,3-butadiene, 6 wt % of methacrylic acid, and 6 wt % of 2-hydroxyethyl methacrylate as the monomer mixture was added to the same reactor at the time of preparing the carboxylic acid-modified nitrile-based copolymer latex composition, provided that 2-hydroxyethyl methacrylate was not added before the polymerization was initiated and an entire amount (6 wt %) of 2-hydroxyethyl methacrylate was added at a polymerization conversion rate of 70%. Here, the obtained carboxylic acid-modified nitrile-based copolymer latex composition had a solid content concentration of 45 wt % and pH of 8.5.

Comparative Example 5

Comparative Example 5 was performed in the same manner as in Example 1 except that 100 parts by weight of a monomer mixture including 32 wt % of acrylonitrile, 59 wt % of 1,3-butadiene, 6 wt % of methacrylic acid, and 3 wt % of 2-hydroxyethyl acrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 6

Comparative Example 6 was performed in the same manner as in Example 1 except that 100 parts by weight of a monomer mixture including 32 wt % of acrylonitrile, 59 wt % of 1,3-butadiene, 6 wt % of methacrylic acid, and 3 wt % of 2-hydroxypropyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 7

Comparative Example 7 was performed in the same manner as in Example 1 except that 100 parts by weight of a monomer mixture including 32 wt % of acrylonitrile, 59 wt % of 1,3-butadiene, 6 wt % of methacrylic acid, and 3 wt % of 4-hydroxybutyl acrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Comparative Example 8

Comparative Example 8 was performed in the same manner as in Example 1 except that 100 parts by weight of a monomer mixture including 32 wt % of acrylonitrile, 59 wt % of 1,3-butadiene, 6 wt % of methacrylic acid, and 3 wt % of 4-hydroxybutyl methacrylate as the monomer mixture was added to the same reactor at the time of preparing the carboxylic acid-modified nitrile-based copolymer latex composition. Here, the obtained carboxylic acid-modified nitrile-based copolymer latex composition had a solid content concentration of 45 wt % and pH of 8.5.

Experimental Example

Polymerization stability and long-term storage stability of each of the carboxylic acid-modified nitrile-based copolymer latex compositions prepared in Examples 1 to 6 and Comparative Examples 1 to 8, and tensile properties of the tensile strength, elongation, and 300% modulus, chemical resistance, durability, syneresis, and an amount of total volatile organic compounds (TVOC) of the dip-molded articles are shown in Tables 1 and 2 below together with the monomer composition (wt %, monomer mixture) and the addition timing (%, polymerization conversion rate) of each carboxylic acid-modified nitrile-based copolymer, and the kind and amount (part by weight, based on 100 parts by weight of the solid content of the carboxylic acid-modified nitrile-based copolymer latex composition) of the crosslinking agent composition.

Tensile properties (tensile strength, elongation, and 300% modulus): A dumbbell-shaped test piece was manufactured in accordance with ASTM D-412 using the dip-molded articles obtained in each of the Examples and Comparative Examples. The test piece was pulled at a stretching speed of 500 mm/min using a universal testing machine (UTM), the tensile strength and elongation at break were measured, and the stress at an elongation of 300% (300% modulus) was measured. As the tensile strength and elongation were higher, the tensile properties were excellent, and as the 300% modulus was lower, a wearing feeling was excellent.

Durability (hours): The glove, which is a dip-molded article obtained in each of the Examples and Comparative Examples, was worn, and the time taken when the glove was torn was measured and shown. The durability was judged to be sufficient when the glove was not torn even after 4 hours or more had elapsed since the glove was worn. Thus, at the time of measuring durability, the measurement time was based on 4 hours.

Chemical resistance (min): A test piece for measuring chemical resistance was manufactured in accordance with EN374-3:2003 using the dip-molded articles obtained in each of the Examples and Comparative Examples. This test piece was brought into contact with hexane, which is a chemical substance to be measured, contained in a test vessel having a diameter of 51 mm and a depth of 35 mm, and the time taken for hexane to pass through the test piece at a rate of 1 µg/cm²/min was measured and shown.

Syneresis (min): A hand-shaped ceramic mold was immersed in the coagulant solution used at the time of manufacturing the dip-molded article for 1 minute, then taken out, and dried at 80° C. for 3 minutes to coat the coagulant onto the hand-shaped mold. Then, the hand-shaped mold coated with the coagulant was immersed in the latex composition for dip-molding of each of the Examples and Comparative Examples for 1 minute, and then taken out, and the time taken for a droplet to fall down from the hand-shaped mold was measured. A case in which the droplet did not fall down within 5 minutes was marked by X.

Measurement of amount of total volatile organic compound (TVOC) of dip-molded article (Gloves) (ppm): The dip-molded articles obtained in each of the Examples and Comparative Examples were placed in a Tedlar bag, filled with 1 L of air of air components, and left at 60° C. for 24 hours. After 24 hours, the air in the Tedlar bag was collected in a tenax tube, and the amount of volatile organic compounds (VOC) in the air collected was measured using a gas chromatograph-mass spectrometer (GC/MS) and shown.

Polymerization stability (wt %): The carboxylic acid-modified nitrile-based copolymer latex composition prepared in each of the Examples and Comparative Examples was sieved through a sieve having a 200 mesh size to separate particles solidified at an average particle diameter of 74 µm or more, a weight of the coagulum formed in the latex composition was measured, and a wt % with respect to the total weight of the latex composition was calculated and shown.

Long-term storage stability: The polymerization of the carboxylic acid-modified nitrile-based copolymer latex composition in each of the Examples and Comparative Examples was completed, each carboxylic acid-modified nitrile-based copolymer latex composition was stored under conditions at 40% humidity and 25° C. for 3 months, and then the conditions of the latex composition were observed. A case in which the latex composition was not agglomerated was marked by ⊚, a case in which agglomerates were produced in an amount of 2 wt % or less based on the solid content was marked by o, a case in which agglomerates were produced in an amount of more than 2 wt % to less than 10 wt % was marked by Δ, and a case in which agglomerates were produced in an amount of 10 wt % or more was marked by X.

TABLE 1

| | Classification | | Example 1 | 2 | 3 | 4 | 5 | 6 |
|---|---|---|---|---|---|---|---|---|
| Monomer Composition And Addition Timing | AN[2] | Composition (wt %) | 32 | 30 | 32 | 30 | 32 | 30 |
| | BD[3] | Composition (wt %) | 59 | 58 | 60.5 | 58 | 59 | 58 |
| | MA[4] | Composition (wt %) | 6 | 6 | 6 | 6 | 6 | 6 |
| | 2-HEMA[5] | Composition (wt %) | 3 | 6 | 1.5 | 3 | 3 | 6 |
| | | Addition timing (%[1]) | 0 | 0 | 0 | 0 | 30 | 0 |
| | Sum | Composition (wt %) | 100 | 100 | 100 | 100 | 100 | 100 |
| Cross-linking Agent Composition | Sulfur | (parts by weight) | 1 | 1 | 1 | 1 | — | — |
| | ZDBC[10] | (part by weight) | 0.7 | 0.7 | 0.7 | 0.7 | — | — |
| | Zinc Oxide | (part by weight) | 1.5 | 1.5 | 1.5 | 1.5 | — | — |
| | Aluminium acetylacetonate | (part by weight) | — | — | — | — | 2 | — |
| | Aluminium Glycolate | (part by weight) | — | — | — | — | — | 2 |
| Tensile Properties | Tensile Strength | (MPa) | 36.2 | 38.1 | 35.5 | 37.5 | 36.3 | 38.6 |
| | Elongation | (%) | 555 | 504 | 572 | 566 | 630 | 564 |
| | 300% Modulus | (MPa) | 6.5 | 7.9 | 5.3 | 6.0 | 4.9 | 5.9 |
| | Durability | (hour) | >4 | >4 | >4 | >4 | >4 | >4 |
| | Chemical resistance | (min) | >480 | >480 | >480 | >480 | >480 | >480 |
| | Syneresis | (min) | X | X | 3 | X | 2.5 | 4 |
| | TVOC of dip-molded article | (ppm) | 0.27 | 0.36 | 0.2 | 0.45 | 0.11 | 0.14 |
| | Polymerization Stability | (wt %) | <0.01 | <0.01 | <0.01 | <0.01 | <0.01 | <0.01 |
| | Long-term Storage Stability | | ⊚ | ○ | ⊚ | ⊚ | ⊚ | ⊚ |

[1]% means a polymerization conversion rate, 0% means that the addition is performed before the polymerization is initiated.
[2]AN: Acrylonitrile
[3]BD: 1,3-Butadiene
[4]MA: Methacryilc acid
[5]2-HEMA: 2-Hydroxyethyl methacrylate
[10]ZDBC: Zinc di-n-butyldithiocarbamate (Vulcanization accelerator)

TABLE 2

| Classification | | | Comparative Example 1 | 2 | 3 | 4 | 5 | 6 | 7 | 8 |
|---|---|---|---|---|---|---|---|---|---|---|
| Monomer Composition And Addition Timing | AN[2)] | Composition (wt %) | 32 | 30 | 32 | 30 | 32 | 32 | 32 | 32 |
| | BD[3)] | Composition (wt %) | 62 | 56.5 | 61.9 | 58 | 59 | 59 | 59 | 59 |
| | MA[4)] | Composition (wt %) | 6 | 4.5 | 6 | 6 | 6 | 6 | 6 | 6 |
| | 2-HEMA[5)] | Composition (wt %) | — | 12 | 0.1 | 6 | — | — | — | — |
| | | Addition timing (%[1)]) | — | 0 | 0 | 70 | — | — | — | — |
| | 2-HEA[6)] | Composition (wt %) | — | — | — | — | 3 | — | — | — |
| | | Addition timing (%[1)]) | — | — | — | — | 0 | — | — | — |
| | 2-HPMA[7)] | Composition (wt %) | — | — | — | — | — | 3 | — | — |
| | | Addition timing (%[1)]) | — | — | — | — | — | 0 | — | — |
| | 4-HBA[8)] | Composition (wt %) | — | — | — | — | — | — | 3 | — |
| | | Addition timing (%[1)]) | — | — | — | — | — | — | 0 | — |
| | 4-HBMA[9)] | Composition (wt %) | — | — | — | — | — | — | — | 3 |
| | | Addition timing (%[1)]) | — | — | — | — | — | — | — | 0 |
| | Sum | (wt %) | 100 | 100 | 100 | 100 | 100 | 100 | 100 | 100 |
| Cross-linking Agent Composition | Sulfur | (parts by weight) | 1 | 1 | 1 | 1 | 1 | 1 | 1 | 1 |
| | ZDBC[10)] | (part by weight) | 0.7 | 0.7 | 0.7 | 0.7 | 0.7 | 0.7 | 0.7 | 0.7 |
| | Zinc Oxide | (part by weight) | 1.5 | 1.5 | 1.5 | 1.5 | 1.5 | 1.5 | 1.5 | 1.5 |
| | Aluminium acetylacetonate | (part by weight) | — | — | — | — | — | — | — | — |
| | Aluminium Glycolate | (part by weight) | — | — | — | — | — | — | — | — |
| Tensile Properties | Tensile Strength | (MPa) | 36 | 30 | 36.1 | 35.7 | 33.7 | 34.8 | 33.0 | 33.5 |
| | Elongation | (%) | 548 | 453 | 550 | 546 | 568 | 526 | 561 | 548 |
| | 300% Modulus | (MPa) | 6.1 | 9.6 | 6.2 | 6.3 | 5.5 | 6.4 | 5.0 | 5.1 |
| Durability | | (hour) | 2 | >4 | 2 | 3 | 2 | 3 | 2 | 2 |
| Chemical resistance | | (min) | 40 | >480 | 40 | 150 | 142 | 180 | 100 | 90 |
| Syneresis | | (min) | 1 | X | 1 | 4 | 1 | 1 | 3 | 3 |
| TVOC of dip-molded article | | (ppm) | 0.31 | 0.4 | 0.28 | 0.98 | 0.64 | 0.76 | 0.68 | 0.71 |
| Polymerization Stability | | (wt %) | <0.01 | <0.01 | <0.01 | 1 | 2 | 0.9 | 1.5 | 1.7 |
| Long-term Storage Stability | | | ◉ | X | ◉ | X | ○ | ○ | Δ | Δ |

[1)] % means a polymerization conversion rate, 0% means that the addition performed before the polymerization is initiated.
[2)] AN: Acrylonitrile
[3)] BD: 1,3-Butadiene
[4)] MA: Methacrylic acid
[5)] 2-HEMA: 2-Hydroxyethyl methacrylate
[6)] 2-HEA: 2-Hydroxyethyl acrylate
[7)] 2-HPA: 2-Hydroxypropyl acrylate
[8)] 4-HBA: 4-Hydroxybutyl acrylate
[9)] 4-HBMA: 4-Hydroxybutyl methacrylate
[10)] ZDBC: Zinc di-n-butyldithiocarbamate (Vulcanization accelerator)

As shown in Tables 1 and 2, in the Examples 1 to 6 prepared according to the present invention, as compared with Comparative Example 1 prepared using only acrylonitrile, 1,3-butadiene, and methacrylic acid as monomers, it could be confirmed that the tensile strength, elongation, and 300% modulus equal to or more than those of Comparative Example 1 were exhibited, simultaneously durability and chemical resistance were very excellent, syneresis was not generated to obtain excellent workability, and thus it was possible to reduce a defective rate in manufacturing the dip-molded articles, and further the amount of residual monomers was small, and the amount of the coagulum in the carboxylic acid-modified nitrile-based copolymer latex composition was less than 0.01 wt %, and thus the polymerization stability was excellent and the long-term storage stability was excellent.

On the other hand, in the Comparative Example 2 in which an excess amount of 2-hydroxyethyl methacrylate monomer was used, it could be confirmed that the tensile properties were lowered due to the decrease of the amount of the other monomers, and the long-term storage stability was very poor due to the excessively added 2-hydroxyethyl methacrylate monomer. In the Comparative Example 3 in which a small amount of 2-hydroxyethyl methacrylate monomer was used, the effect of improving durability, chemical resistance, and syneresis was extremely small.

In addition, in the Comparative Example 4 in which the entire amount of the 2-hydroxyethyl methacrylate monomer was added at the polymerization conversion rate of 70%, which is the latter stage of the polymerization, it could be confirmed that even though the 2-hydroxyethyl methacrylate monomer was added in the same amount as in Examples 2 and 4, the effect of improving durability and chemical resistance was small, but the polymerization stability, long-term storage stability, and syneresis were lowered, and the TVOC of the dip-molded article increased. Particularly, even though the 2-hydroxyethyl methacrylate monomer was added in an appropriate amount, when the entire amount was added at the polymerization conversion rate of 70%, which is the latter stage of the polymerization, it could be confirmed that the amount of the coagulum in the carboxylic acid-modified nitrile-based copolymer latex composition was 1 wt %, and thus the polymerization stability was poor, which means that there is a difference in polymerization stability depending on the addition timing of the 2-hydroxyethyl methacrylate monomer, and which is caused since the reactivity of the 2-hydroxyethyl methacrylate monomer is low as compared with other comonomers, the entire amount of the 2-hydroxyethyl methacrylate monomer does not participate in the polymerization reaction until the polymerization is completed, but is present in the latex composition as the residual monomer.

Meanwhile, in the Comparative Example 5 in which 2-hydroxyethyl acrylate was used, the Comparative Example 6 in which 2-hydroxypropyl acrylate was used, the Comparative Example 7 in which 4-hydroxybutyl acrylate was used, the Comparative Example 8 in which 4-hydroxybutyl methacrylate was used, which are cases in which the hydroxyalkyl(meth)acrylate-based monomer was used, but the 2-hydroxyethyl methacrylate monomer was not used, it could be confirmed in all cases that the effect of improving durability, chemical resistance, and syneresis was small or rather decreased, the polymerization stability was poor, and the TVOC of the dip-molded article increased. In particular, in Comparative Examples 7 and 8 in which the number of carbon atoms in the alkyl group was high, it could be confirmed that an efficiency of forming a copolymer with other comonomers was poor, and thus residual monomers were present in the latex composition, and further, the residual monomers were not easily reduced due to high boiling point even after the deodorization process, thereby lowering the polymerization stability, the TVOC of the dip-molded article increased, and the long-term storage stability was poor.

From the above results, the present inventors confirmed that when the dip-molded article such as a glove, or the like, was manufactured by using the latex composition for dip-molding including the carboxylic acid-modified nitrile-based copolymer latex composition according to the present invention, tensile strength of the manufactured dip-molded article was improved, wearing feeling was improved by reducing 300% modulus, and at the same time, durability, chemical resistance, and workability of the dip-molded article were improved, and the amounts of residual monomers were reduced.

The invention claimed is:

1. A carboxylic acid-modified nitrile-based copolymer latex composition comprising:
   a carboxylic acid-modified nitrile-based copolymer, and a coagulum,
   wherein the carboxylic acid-modified nitrile-based copolymer includes a conjugated diene-based monomer-derived repeating unit, an ethylenically unsaturated nitrile-based monomer-derived repeating unit, an ethylenically unsaturated acid monomer-derived repeating unit, and a 2-hydroxyethyl methacrylate monomer-derived repeating unit in an amount 1.5 wt % to 6 wt % relative to a total weight of the carboxylic acid-modified nitrile-based copolymer, and
   wherein the coagulum is included an amount of less than 1 wt % relative to a total weight of the latex composition.

2. The carboxylic acid-modified nitrile-based copolymer latex composition of claim 1, wherein the carboxylic acid-modified nitrile-based copolymer includes the conjugated diene-based monomer-derived repeating unit in an amount of 40 wt % to 80 wt %, the ethylenically unsaturated nitrile-based monomer-derived repeating unit in an amount of 10 wt % to 50 wt %, and the ethylenically unsaturated acid monomer-derived repeating unit in an amount of 0.1 wt % to 10 wt %.

3. The carboxylic acid-modified nitrile-based copolymer latex composition of claim 1, wherein the coagulum is included in an amount of less than 0.01 wt % relative to a total weight of the latex composition.

4. A method of preparing the carboxylic acid-modified nitrile-based copolymer latex composition of claim 1, comprising:
   polymerizing a monomer mixture including 1.5 wt % to 6 wt % of the 2-hydroxyethyl methacrylate monomer with respect to a total amount of the monomer mixture to prepare a carboxylic acid-modified nitrile-based copolymer latex composition including a carboxylic acid-modified nitrile-based copolymer,
   wherein
   an entire amount of the 2-hydroxyethyl methacrylate monomer included in the monomer mixture is added before the polymerizing is initiated;
   a part thereof is added before the polymerization is initiated and the remaining amount thereof is added at a polymerization conversion rate of 20% to 60%; or
   the entire amount thereof is added at the polymerization conversion rate of 20% to 60%.

5. A latex composition for dip-molding comprising:
   the carboxylic acid-modified nitrile-based copolymer latex composition of claim 1; and a cross-linking agent composition.

6. The latex composition for dip-molding of claim 5, wherein the cross-linking agent composition includes a vulcanization agent and a vulcanization accelerator.

7. The latex composition for dip-molding of claim 5, wherein the cross-linking agent composition includes a polyvalent metal cation compound.

8. The latex composition for dip-molding of claim 7, wherein the polyvalent metal cation compound is at least one selected from the group consisting of aluminium glycolate, aluminium acetylacetonate, aluminium lactate, and aluminium tartrate.

9. An article comprising:
a layer derived from the latex composition for dip-molding of claim 5.

* * * * *